United States Patent
Loison et al.

(10) Patent No.: US 7,251,725 B2
(45) Date of Patent: Jul. 31, 2007

(54) BOOT PROCESS FOR A COMPUTER, A BOOT ROM AND A COMPUTER HAVING A BOOT ROM

(75) Inventors: Francois Loison, Verfeil (FR); Francois-Xavier Lecarpentier, Sassenage (FR); Dominique Vicard, Bernin (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 719 days.

(21) Appl. No.: 10/211,961

(22) Filed: Aug. 1, 2002

(65) Prior Publication Data
US 2003/0046529 A1 Mar. 6, 2003

(30) Foreign Application Priority Data
Aug. 6, 2001 (EP) .................................. 01410099

(51) Int. Cl.
*G06F 15/16* (2006.01)
(52) U.S. Cl. ................ 713/1; 713/2; 713/100; 709/202; 709/203; 709/220; 709/221; 709/223
(58) Field of Classification Search ............... 713/1, 713/2, 100; 709/219, 222
See application file for complete search history.

(56) References Cited

U.S. PATENT DOCUMENTS

| | | | | | |
|---|---|---|---|---|---|
| 5,842,011 | A | * | 11/1998 | Basu ........................... 713/2 |
| 5,974,547 | A | * | 10/1999 | Klimenko .................... 713/2 |
| 5,978,911 | A | * | 11/1999 | Knox et al. .................. 713/1 |
| 6,421,777 | B1 | * | 7/2002 | Pierre-Louis et al. ........ 713/2 |
| 6,463,535 | B1 | * | 10/2002 | Drews ....................... 713/176 |
| 6,601,096 | B1 | * | 7/2003 | Lassiter, Jr. ................. 709/222 |
| 6,601,166 | B1 | * | 7/2003 | Ayyar et al. ................. 713/2 |
| 6,691,160 | B1 | * | 2/2004 | Bradley ..................... 709/222 |
| 6,735,692 | B1 | * | 5/2004 | Murphrey et al. ............ 713/1 |
| 6,742,028 | B1 | * | 5/2004 | Wang et al. ................. 709/223 |
| 6,751,658 | B1 | * | 6/2004 | Haun et al. ................. 709/222 |
| 6,757,723 | B1 | * | 6/2004 | O'Toole et al. ............. 709/222 |
| 6,795,912 | B1 | * | 9/2004 | Itoh et al. .................... 713/2 |
| 6,810,478 | B1 | * | 10/2004 | Anand et al. ................ 713/2 |
| 6,826,710 | B2 | * | 11/2004 | Merkin et al. ............... 714/6 |
| 7,080,134 | B2 | * | 7/2006 | Doherty et al. ............. 709/221 |
| 2004/0162893 | A1 | * | 8/2004 | Brown et al. .............. 709/222 |

* cited by examiner

*Primary Examiner*—A. Elamin
(74) *Attorney, Agent, or Firm*—Ladas & Parry LLP

(57) ABSTRACT

A boot process for a computer comprising, in a client environment,
a) generating, using a non-volatile data storage medium, a boot image request,
b) passing the boot image request to a boot image repository,
c) receiving, from the boot image repository, the requested boot image and
d) booting the computer using the received boot image, characterised in that
e) the boot image request is passed using an Internet Protocol and is sent to a predetermined location.

21 Claims, 2 Drawing Sheets

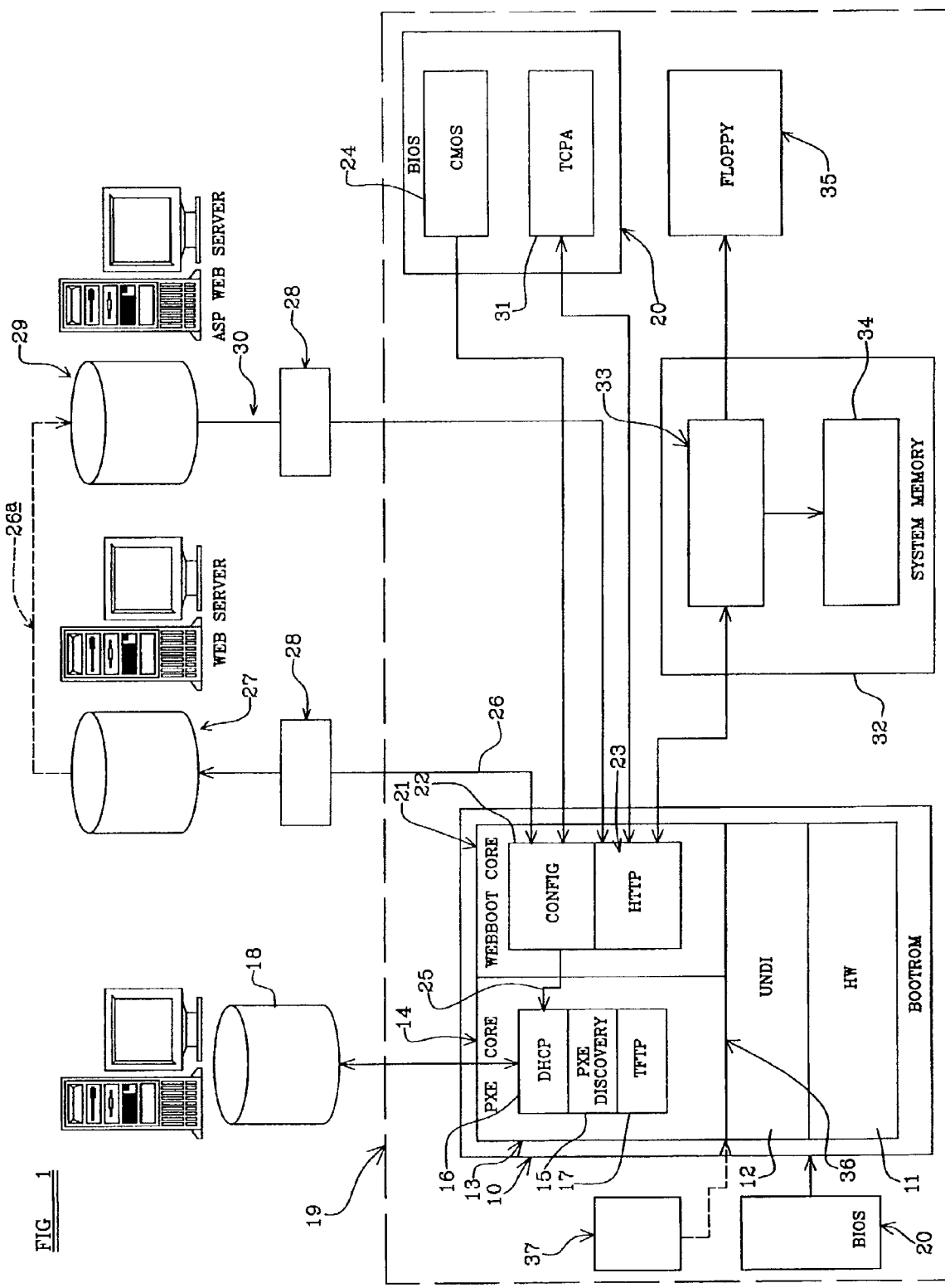

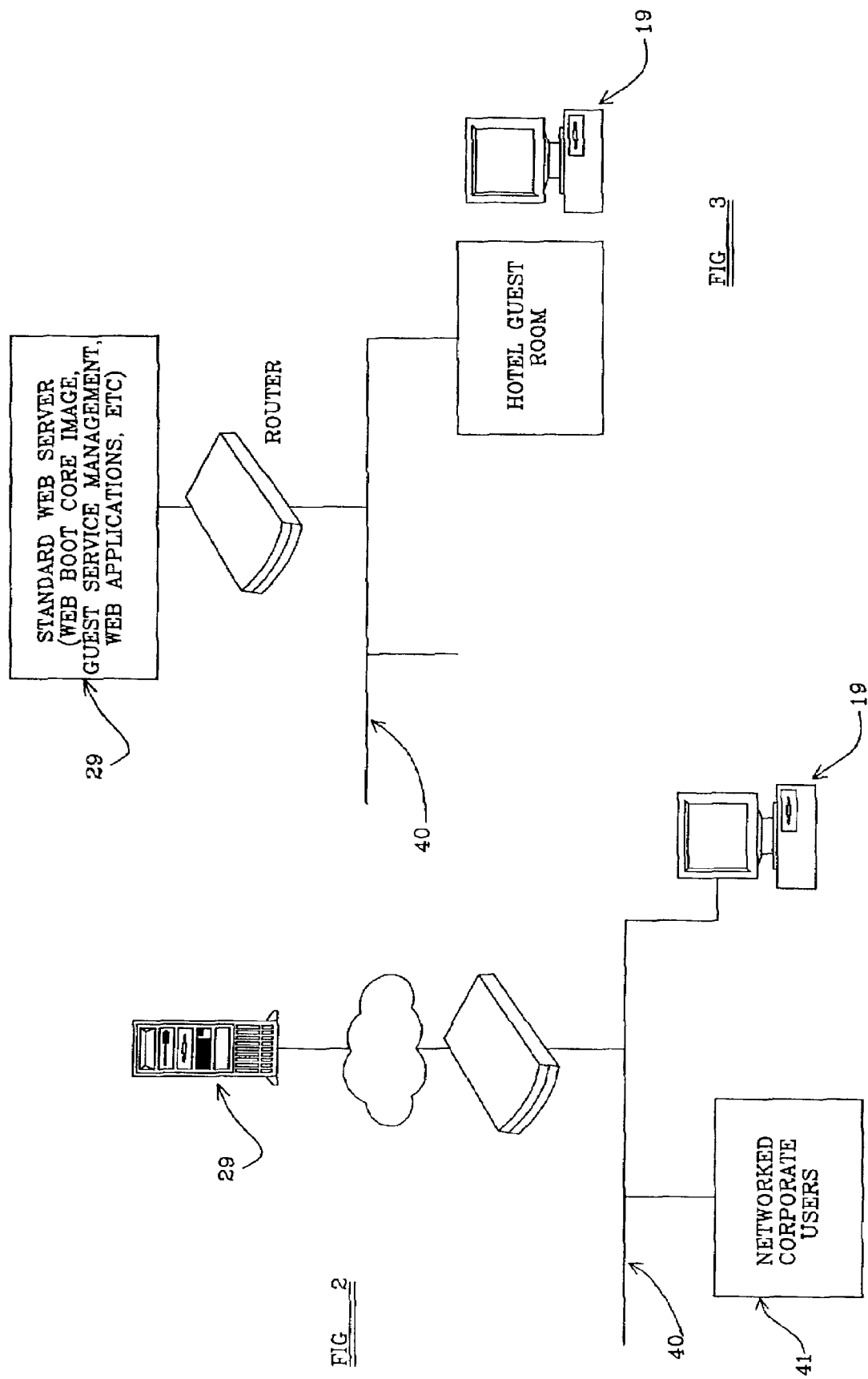

BOOT PROCESS FOR A COMPUTER, A BOOT ROM AND A COMPUTER HAVING A BOOT ROM

DESCRIPTION OF AND BACKGROUND TO INVENTION

This invention relates to a boot process for a computer, to a boot ROM and to a computer having a boot ROM.

In particular, although not exclusively, the invention relates broadly to a remote boot process whereby a computer may be initialised—i.e. booted—using boot program information (known as a boot image) obtained from a remote source, i.e. a source in communication with—but separate from—the computer concerned.

Remote boot processes are useful for a variety of reasons. First of all, if a particular client machine fails to boot as a result of a hardware or software malfunction, a remote boot image can be downloaded from another location to provide the malfunctioning client machine with a replacement code which enables, for example, remote problem notification, diagnosis and possible resolution of the problem.

In addition, remote boot processes allow networks to be composed of a number of "thin client" machines having little or no local data storage capability, with the required operating system, for example, being downloaded from a remote data store as and when the machines are initiated. This reduces the cost of the network clients and provides a persistent image that can be restored easily and that cannot be damaged by a local user.

A common remote boot system is Intel's Wired for Management (WfM) standard which incorporates a pre-boot execution environment (PXE) protocol.

In brief, the PXE protocol requires an appropriately configured BIOS and boot ROM which, when the computer is powered up, are effective to broadcast a general DISCOVER signal which is intended eventually to reach a local Intranet DHCP (Dynamic Host Configuration Protocol) server which, in turn, provides the client machine with a list of appropriate available boot servers. Using a low level protocol such as TFTP, the client machine then downloads the required boot image from an appropriate boot server and executes the boot image in generally conventional fashion.

The PXE approach, whilst operating satisfactorily in an enclosed (Intranet) environment does however have some disadvantages. First of all, a specific DHCP server is required—this is not only expensive but can require local maintenance. In addition, such servers must be configured to perform PXE-specific tasks, thus necessitating the presence of a "PXE-ready" infrastructure. Thirdly, and perhaps most importantly, the protocol used by the PXE approach is severely limiting, in that it is unable to send or transmit signals beyond the enclosed Intranet.

It is an object of the present invention to provide a boot process for a computer which overcomes or at least alleviates these problems, and to provide a boot ROM which allows a computer to operate in such an improved manner. It is also an object of the present invention to provide a computer having such a boot ROM.

SUMMARY OF THE INVENTION

According to a first aspect of the present invention, there is provided a boot process for a computer comprising, in a client environment:

a) generating, using a non-volatile data storage medium, a boot image request, b) passing the boot image request to a boot image repository, c) receiving, from the boot image repository, the requested boot image and d) booting the computer using the received boot image, characterised in that e) the boot image request is passed using an Internet Protocol and is sent to a predetermined location.

The boot image request is preferably a GET command, passed using a higher level Internet Protocol such as HTTP, proxy HTTP or HTTPS.

As will be appreciated to those well versed in the relevant art, passing the boot image request using such a higher level Internet Protocol provides for a great degree of versatility, in that the boot image request can be routed towards its final destination using existing (and widely available) Internet web servers (or proxies), and is also advantageous in that the boot image request is able to traverse firewalls in view of the HTTP transparency which such security devices confer. Moreover, using HTTP and other such protocols enables dynamic boot image requests to be generated, in a manner akin to the generation of dynamic web content.

Conveniently, therefore, the boot image repository is a web server, such as a HTTP web server.

The predetermined location may correspond to the location of the boot image repository.

However, the predetermined location may be an intermediate server, the intermediate server acting to redirect and forward the incoming boot image request to the boot image repository.

In this way, a default boot process may require the generation of a boot image request and transmission of the request to a first, predetermined location, with the boot image request then being redirected, in accordance with certain criteria, to an appropriate boot image repository.

The boot image request generated using the non-volatile data storage medium may include an identifier which identifies the computer in which the request was generated, the incoming boot image request thus being forwarded to one of a plurality of boot image repositories in accordance with the identifier.

As will be appreciated, the identity—and conceivably the location—of the computer being booted can thus be effective to "select" the boot image repository from which the boot image is eventually received.

The identifier may be a Universally Unique Identifier (UUID).

It will be understood that an identifier (such as a UUID, for example) may also be used to label the requested boot image.

The boot image request may initially be dispatched as a broadcast signal, and may subsequently be passed to the repository by using a higher level Internet Protocol.

In this way, it is envisaged by the applicants that currently available PXE protocol boot systems could be adapted to retrieve boot images over an Internet web platform by modifying the DHCP DISCOVER commands using a higher level format such as HTTP.

The boot process may comprise, prior to executing the received boot image, checking the received boot image (or at least its envelope) with a control element supplied to the or an additional non-volatile data storage medium.

In this way, the authenticity and/or integrity of the boot image may be checked prior to execution of the image, to ensure, for example, that the boot image has not been corrupted and to ensure that the correct boot image has in fact been received from the repository. A digital signature, descriptor and/or a check digit may be used as the control element to effect the check.

The control element may be received from the repository.

It will be understood that it may suffice to check the structure of the boot image (i.e. the identities of the files received), with it not being necessary to check the functionality (i.e. precise content) of the image.

The boot process may thus comprise, prior to receiving the boot image, receiving a descriptor which describes, to the computer, the nature, structure and size, for example, of the boot image located in the boot image repository.

The descriptor may be passed to the or an additional non-volatile data storage medium.

Prior to execution of the received boot image, the descriptor may be used to check that the nature, structure and size, for example, of the received boot image is as expected—thus, the computer is able to check that the boot image actually received is that which should have been received.

The boot process may also comprise, prior to booting the computer, validating the received boot image using a certification system such as PKI or TCPA.

The boot image may be received using a higher level Internet Protocol such as HTTP, proxy HTTP or HTTPS.

It will be appreciated that other Internet Protocols such as FTP could conceivably be used to receive the requested boot image. However, as FTP requests cannot be customised in accordance, for example, with user profile information, it may be necessary to effect such a FTP download subsequent to receipt from the boot image repository of a file set which can be accessed using the FTP Protocol. Such an arrangement could be advantageous as the FTP Protocol is less "data heavy" than HTTP and a FTP boot image download may therefore be quicker than a boot image download using HTTP.

The boot process may also comprise effecting an Operating System download, the download being effected from an Internet Website.

The boot image request may be generated in accordance with user profile information. The user profile information may conveniently be transferred to the computer subsequent to initiation of the boot process. However, the user profile information could also be transferred to the computer prior to initiation of the boot process.

Preferably, the user profile information is transferred to the computer from an external non-volatile database storage device.

In this way, a user may be given control of a part of the boot process, in that the boot image request is generated in response to the information supplied by the user to the computer.

Conveniently, the user profile information is transferred to the computer from a smart card, the smart card also conceivably being operative to encrypt the boot image request and/or to decrypt the received boot image.

The boot process may comprise a user profile information reception step, during which the user profile information is transferred to the computer.

The boot process may be operative to generate a default boot image request in the absence of user profile information being transferred to the computer during said user profile information reception step.

Where an intermediate server is provided, it may be effective to modify the boot image request in accordance with the user profile information.

Alternatively, the user profile information may be used to modify a default boot image located within the boot image repository. The default boot image may thus comprise one or more tags.

In accordance with a second aspect of the present invention, there is provided a boot ROM comprising a boot image request generation module and a boot image request dispatch module, the boot ROM being arranged to generate the boot image request and, using an Internet Protocol, to dispatch the request to a predetermined location.

The boot ROM preferably is adapted to effect a boot process in accordance with one or more of the preceding paragraphs.

In accordance with a third aspect of the present invention, there is provided a computer having a boot ROM substantially in accordance with the second aspect of the present invention.

In accordance with a fourth aspect of the present invention, there is provided a boot process for a computer comprising, in a web server environment:

a) receiving a boot image request from the computer,
b) generating, in response to the request, a boot image and
c) passing the boot image to the computer.

The invention, in its fourth aspect, may involve an automatic resource discovery protocol such as Service Location Protocol (SLP).

The invention, in its fourth aspect, may comprise one or more of the features of the first three aspects of the present invention.

In accordance with a fifth aspect of the present invention, there is provided a boot process for a computer comprising, in a client environment:

a) generating, using a non-volatile data storage medium, a boot image request,
b) passing the boot image request to a boot image repository,
c) receiving, from the boot image repository, the requested boot image and
d) booting the computer using the received boot image, characterised in that
e) the boot image request is passed using a higher level Internet Protocol such as HTTP, proxy HTTP or HTTPS.

The boot process may involve an automatic resource discovery protocol such as Service Location Protocol (SLP).

SLP, as will be understood by those well versed in the relevant art, enables networked services and resources to be identified—and hence utilised—even where the precise name or network IP address of the resource/service is not known to the user. This is achieved by the use of user agents, service agents and (if applicable) directory agents, which together enable user requests to be matched with resource/service availability using so-called "predicates".

As will therefore be appreciated, the use of such an automatic resource discovered protocol may enable the required boot image to be located dynamically thus obviating the necessity to know the precise location of the boot image, at the outset.

The invention, in its fifth aspect, may comprise one or more of the features of the first four aspects of the present invention.

BRIEF DESCRIPTION OF THE DRAWINGS

The invention will now be described in greater detail, but strictly by way of example only, by reference to the accompanying drawings, of which:

FIG. 1 is a schematic, but fairly detailed illustration of how the boot process is effected, and the configuration of the required hardware;

FIG. 2 is a schematic illustration of how the invention can be used in a corporate local area network (LAN) environment; and FIG. 3 is a somewhat similar schematic illustration of how the invention can be put into practice in a non-corporate environment.

BEST MODE OF THE INVENTION

Referring first to FIG. 1, reference numeral 10 indicates an embodiment of the boot ROM of the present invention, the boot ROM comprising, in generally conventional manner, a hardware component 11 and a Universal Network Driver Interface (UNDI) 12, image which provides the machine with which the boot ROM 10 is associated with network interface capabilities, in a manner known in itself in the art.

The boot ROM 10, in this example, is somewhat "dual purpose", in that the boot process proper (i.e. the boot image search, retrieval and execution) can be effected in one of two ways, depending upon the specific configuration of this boot image section 13 of the boot ROM 10.

In brief, the boot image section 13 comprises a generally conventional PXE core 14, of the type featured in the well known "Wired for Management" (WfM) protocol of Intel Corporation. Broadly speaking, the PXE core comprises a PXE Discovery module 15 which is operative to dispatch, in conjunction with a Dynamic Host Configuration Protocol (DHCP) module 16, a DHCP DISCOVER signal which is effective to locate an available DHCP server 18, located on the internal Intranet to which the computer 19 may be connected.

Again, in conventional manner, the PXE core 14 comprises a Trivial File Transfer Protocol (TFTP) module 17 which is operative to receive, from the DHCP server 18, an appropriate boot image in TFTP format, to enable to computer 19 to initiate execution of the downloaded boot image.

It will of course be appreciated that, in addition to the boot ROM 10, a BIOS 20 will be required, to initiate the boot process subsequent to "power up" of the computer 19.

In accordance with the invention, the boot ROM 10 comprises a "Web Boot" core 21 having a configuration module 22 and a HTTP request generating/response receiving module 23. The configuration module 22 is operatively associated with the DHCP module 16 so that, under the circumstances described hereafter, the Web Boot core 21 may in fact effect booting of the computer using the PXE core 14 in conjunction with a locally available DHCP server 18.

This is best described by illustrating how the boot process operates, in practice.

When power is first supplied to the computer system, the internal power supply is engaged and undergoes an initialisation process, as is well known in the art. Once a "Power Good" signal has been received from the power supply, the BIOS 20 initiates the boot process. Subsequent to the performance of a satisfactory "Power On Self Test" (POST), the BIOS locates connected devices such as video cards, sound cards and the like and then displays a start up screen. In contrast, however, to conventional boot processes, the BIOS 20 then accesses the boot ROM 10 which in turn (subsequent to initialisation of an optional UNDI driver interface) begins the main part of the boot process. First, a configuration check is carried out between the configuration module 22 and the computer's CMOS chip 24, which may also be located in the BIOS 20. The CMOS chip 24 contains non-volatile information relating to user settings of the computer 19, the CMOS chip thus being able to inform the configuration module 22 whether the required boot image is to be obtained using a local Intranet DHCP server or a HTTP web server in accordance with the invention. If the instructions received from the CMOS chip 24 indicate that the main boot process is to be effected using the PXE core, an appropriate instruction 25 is sent from the configuration module 22 to the DHCP module 16 and/or the PXE Discovery module 15 for the PXE core to locate and retrieve the required boot image in TFTP format, in accordance with the Intel WfM protocol. If will of course be appreciated that this is only possible where a local PXE-specific DHCP server is available, as the WfM PXE protocol does not allow boot images to be obtained from outside an associated LAN, nor for a specific "DISCOVER" signal to be sent to a predetermined, known, destination.

Should the instructions received by the configuration module 22 from the CMOS chip 24 indicate that a web boot is to be effected, the configuration module 22, in conjunction with the HTTP module 23, generates a boot image request 26 and passes this to a web server 27, using a higher level Internet Protocol such as HTTP. It will be appreciated that HTTP is not only routable, in that requests sent to a specified destination are able to reach that destination via a plurality of alternative routes, but that, in addition, the HTTP request is able to pass unhindered through security devices such as firewalls 28. This is of course not the case with the DHCP DISCOVER signals generated using the PXE protocol of the Intel WfM system. It will be understood, however, that the web server 27 could alternatively be located inside the firewall 28; i.e. within an Intranet environment.

To confirm the identity of the computer 19 from which the boot image request 26 is sent, the configuration module 22 may incorporate in the request 26 an identifier such as a Universally Unique Identifier (UUID). Acting on the information contained within the UUID, in conjunction with the source information carried by the HTTP protocol, the web server 27 may redirect the boot image request 26 to a boot image repository 29, which in this example is a web server controlled by an application service provider (ASP). This server could also be located inside the firewall 28.

As the boot image request 26 may have been modified during the redirection process, this is illustrated in dotted form at 26a.

It will of course be appreciated that such a redirection may not in fact be required. Thus, where the web server 27 is able to serve the required boot image directly, an appropriate response may be sent directly from the server 27 to the boot ROM 10 for execution in the manner previously described.

The boot image repository acts on the incoming boot image request 26a and serves, in response to the request, a boot image 30, also in HTTP format. The HTTP boot image is thus also able to traverse any external security devices such as a firewall 28, with the passage of the boot image 30 back to the boot ROM 10 thus being unhindered in this way.

Upon receipt of the boot image 30, the Web Boot core 21 performs an authentication and integrity check using a security procedure such as the Public Key Infrastructure (PKI) system or the Trusted Computing Platform Alliance (TCPA) specification. Both of these procedures are known in themselves, (although not in relation to boot processes) and will not thus be described further in this specification. However, for the avoidance of doubt, the TCPA authentication step may be effected by initiating a connection between the Web Boot core 21 and a TCPA module 31 located within the BIOS 20.

If the authentication and integrity check reveals that the boot image 30 has been corrupted since its dispatch from the repository 29, or if the incoming boot image 30 does not "tally" with an expected image, as detailed by the TCPA module 31, the unacceptable boot image 30 is not executed by the boot ROM 10, with the boot process thus restarting by generation of a fresh boot image request 26, the procedure being repeated until an acceptable boot image 30 is received from the boot image repository 29.

A counter may be provided to establish a limit to the number of unsuccessful checks that can be attempted. Should this limit be reached, an alert may be sent to an administrator, for example.

Upon receipt of an acceptable boot image 30, the image is transferred and/or copied to a volatile (e.g. RAM) part of the computer's system memory 32 where the boot image is executed, in the following way. Execution of the boot image 30 in a boot image execution environment 33 effects a further download of required operating software images such as an appropriate Operating System. This operating software image is preferably downloaded from an Internet web server using HTTP, although other protocols could also be used. For security, a copy of the operating software image 34 may be made, and passed to a floppy drive 35, if one is available. In place of the floppy drive 35, alternative higher capacity storage devices such as a Hard Disk Drive (HDD) or a ZIP drive could be used.

The operating software image 34 is then executed, thus providing the computer 19 with all the required basic components which will enable it to function as a stand-alone PC.

In order to personalise the boot process in accordance with a user's preferences, the boot image request 26 may be configured in accordance with user profile information. To effect this, the boot ROM 10, in conjunction with the BIOS 20, may be arranged to pause the boot process, conveniently after the UNDI interface has been initialised. During this pause, indicated schematically by the dividing line 36, user profile information may be transferred to the computer 19 from an external non-volatile data storage device such as a smart card indicated schematically at 37.

Using a smart card reader (not shown), information from the smart card 37 may be used by the boot ROM 10 to configure the outgoing boot image request 26 in accordance with the user's profile. Thus, the smart card 37 could contain information concerning the user's employers, so that the boot image 30 which is eventually received by the boot ROM 10 is appropriate to the user's tasks. In addition, the smart card 37 may serve to encrypt the outgoing boot image request 26 and to decrypt the incoming boot image 30, thus providing an improved layer of security. Furthermore, user profile information contained within the smart card 37 may be used to generate the identifier (e.g. UUID) which is sent in conjunction with the boot image request to the boot image repository 29, conveniently via the intermediary of the web server 27.

In practice therefore, the boot process may provide the user with an appropriate period (e.g. five to ten seconds) during which the user's smart card should be swiped through a smart card reader connected to the computer 19. On receipt of this user profile information, the Web Boot core 21 is able to tailor the outgoing boot image request 26 appropriately, providing the benefits previously described. Should the period expire with no user profile information having been received, a time out will occur, causing the boot process to continue in a default manner, with a boot image request being sent to a predetermined location.

Referring next to FIG. 2, this shows how the invention may be used in relation to a computer provided on a corporate LAN, for example. The computer 19, connected via a standard Ethernet connection 40 to a number of other computers 41 may, during normal use, be booted "internally", in that the boot process is accomplished conventionally, using the computer's BIOS, boot ROM and hard disk drive, for example. However, in the case of a hardware malfunction (e.g. a hard disk drive failure) the computer 19 will not be able to effect such an "internal" boot process. Under these circumstances, the web boot process of the present invention can take over. Thus, the boot ROM contained within the computer 19 may be adapted, on detection of an "internal" boot process failure, to initialise the Web Boot core (see FIG. 1), and thus to effect a remote boot process via the Web. It will of course be appreciated that such a remote process is almost entirely hardware independent, in that the image is sought and received from an external source. Loading appropriate diagnostic software, for example, may enable the failure to be identified remotely, and for appropriate repair instructions to be dispatched, perhaps in conjunction with replacement parts. Similarly, the applications and software images executed during the boot-up process may be controlled by manipulation of the boot image contained within the web server 29. In this way, a corporate employer, for example, is able to control the initialisation processes which the organisation's computers undergo upon boot-up.

Referring lastly to FIG. 3, this shows how the invention may be used to enable "thin clients" to operate satisfactorily from a remote environment. The situation exemplified in FIG. 3 features a thin client computer 19 located in a hotel guest room, with the computer 19 optionally being connected to a number of other such thin client machines via an Ethernet connection 40. However, the thin client nature of the computer 19 means that it lacks a hard disk drive, a CD ROM drive and even perhaps a floppy drive, meaning that the machine 19, in isolation, is not able to perform any tasks which are likely to be of any use to the user. However, using the remote boot process of the present invention, the computer 19 is able to hook up to a web server 29, which may be maintained by a commercial Internet Service Provider, with a required boot image being obtained, via the Internet, from the server 29. Alternatively, the server 29 could be maintained, for example, by the hotel management, thus enabling the machine 19 to act as terminal for guest information services such as room account information provision, or room services and guest message alerts.

It will be appreciated from the foregoing that the present invention, in its various aspects, provides a remote boot process and associated apparatus which enables a computer to undergo a boot sequence using a boot image obtained from an Internet Website, which provides a number of advantages over existing remote boot procedures. First of all, use of HTTP (or another such "higher level" Internet Protocol) for the outgoing image request enables the destination of the request to be predetermined, in contrast, for example, to the Intel PXE arrangement which operates in a local "broadcast" fashion. In addition, the HTTP boot image request is able to pass unhindered through security firewalls, thus enabling the boot image to be provided using a remote web server, which obviates the requirement of a local PXE-specific DHCP server which is costly and inconvenient for the end user to maintain. Moreover, security of use is assured, not only by use of a reliable identifier such as UUID, but also by virtue of the authentication and integrity checks which the web boot core effects prior to execution of the web boot image.

In addition, it should be understood that although the embodiment shown in FIG. 1 illustrates a boot ROM having a "dual-boot" capability, it may be (and is likely to be) the case that a PXE core is not provided, thus allowing only a web-boot process to be effected.

The Web boot core 21 may, in addition or as an alternative, be provided with a Service Location Protocol (SLP) capability, whereby the HTTP boot image request is able to discover, on an automated basis, the location of the boot image repository, by specifying, in the request, the nature of the image concerned. The precise mode of operation of SLP is known, and will not therefore be described in any great detail herein. However, it will be appreciated that the use of such an automated resource discovery protocol obviates the requirement of a pre-configured boot ROM 10, in that the exact URL of the boot image repository does not need to be known at the outset. In contrast, the SLP arrangement is able to find an appropriate boot image repository by matching the boot image with available Network resources.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A boot process for a computer comprising, in a client environment,
   a) generating, using a non-volatile data storage medium, a boot image request,
   b) passing the boot image request to a boot image repository,
   c) receiving, from the boot image repository, the requested boot image and
   d) booting the computer using the received boot image, characterised in that
   e) the boot image request is passed using a high level Internet Protocol selected from the grouping consisting of HTTP, FTP, proxy HTTP, HTTPS and proxy FTP and is sent to a predetermined location.

2. A boot process according to claim 1 wherein the high level internet protocol is selected from HTTP, proxy HTTP or HTTPS and wherein the boot image request is a GET command, passed using said high level Internet Protocol.

3. A boot process according to claim 1 wherein the boot image repository is a web server.

4. A boot process according to claim 1 wherein the predetermined location corresponds to the location of the boot image repository.

5. A boot process according to claim 1 wherein the predetermined location is an intermediate server, the intermediate server acting to forward the incoming boot image request to the boot image repository.

6. A boot process according to claim 5 wherein the boot image request generated using the non-volatile data storage medium includes an identifier which identifies the computer in which the request is generated, and wherein the incoming request is forwarded to one of a plurality of boot image repositories in accordance with the identifier.

7. A boot process according to claim 6 wherein the identifier is a Universally Unique Identifier (UUID).

8. A boot process according to claim 1 wherein the boot image request initially is dispatched as a broadcast signal and subsequently is passed to the repository by using a higher level Internet Protocol such as HTTP, proxy HTTP or HTTPS.

9. A boot process according to claim 8 wherein the broadcast signal forms part of a DISCOVER command such as a DHCP DISCOVER command.

10. A boot process according to claim 1 comprising, prior to executing the received boot image, checking the received boot image with a control element supplied to the or an additional non-volatile data storage medium.

11. A boot process according to claim 10 wherein the control element is a descriptor.

12. A boot process according to claim 10 wherein the control element is received from the repository.

13. A boot process according to claim 1 comprising, prior to booting the computer, validating the received boot image using a certification system such as PKI or TCPA.

14. A boot process according to claim 1 wherein the boot image is received using a higher level Internet Protocol such as HTTP, FTP, proxy HTTP or proxy FTP.

15. A boot process according to claim 1 further comprising effecting an Operating System download, the download being effected from an Internet Website.

16. A boot according to claim 1 wherein the boot image request is generated in accordance with user profile information.

17. A boot process according to claim 16 wherein the user profile information is transferred to the computer subsequent to initiation of the boot process.

18. A boot process according to claim 16 wherein the user profile information is transferred to the computer from an external non-volatile data storage device.

19. A boot process according to claim 18 wherein the external non-volatile data storage device is a smart card, and wherein the smart card is also operative to encrypt the boot image request and/or to decrypt the received boot image.

20. A boot process for a computer comprising, in a client environment:
   a) generating, using a non-volatile data storage medium, a boot image request,
   b) passing the boot image request to a boot image repository,
   c) receiving, from the boot image repository, the requested boot image and
   d) booting the computer using the received boot image, characterised in that
   e) the boot image request is passed using a higher level Internet Protocol such as HTTP, proxy HTTP or HTTPS.

21. A boot process according to claim 20 involving an automatic resource discovery protocol such as Service Location Protocol (SLP).

* * * * *